(No Model.) 5 Sheets—Sheet 1.
E. & R. CORNELY.
EMBROIDERING AND EDGING MACHINE.
No. 405,146. Patented June 11, 1889.
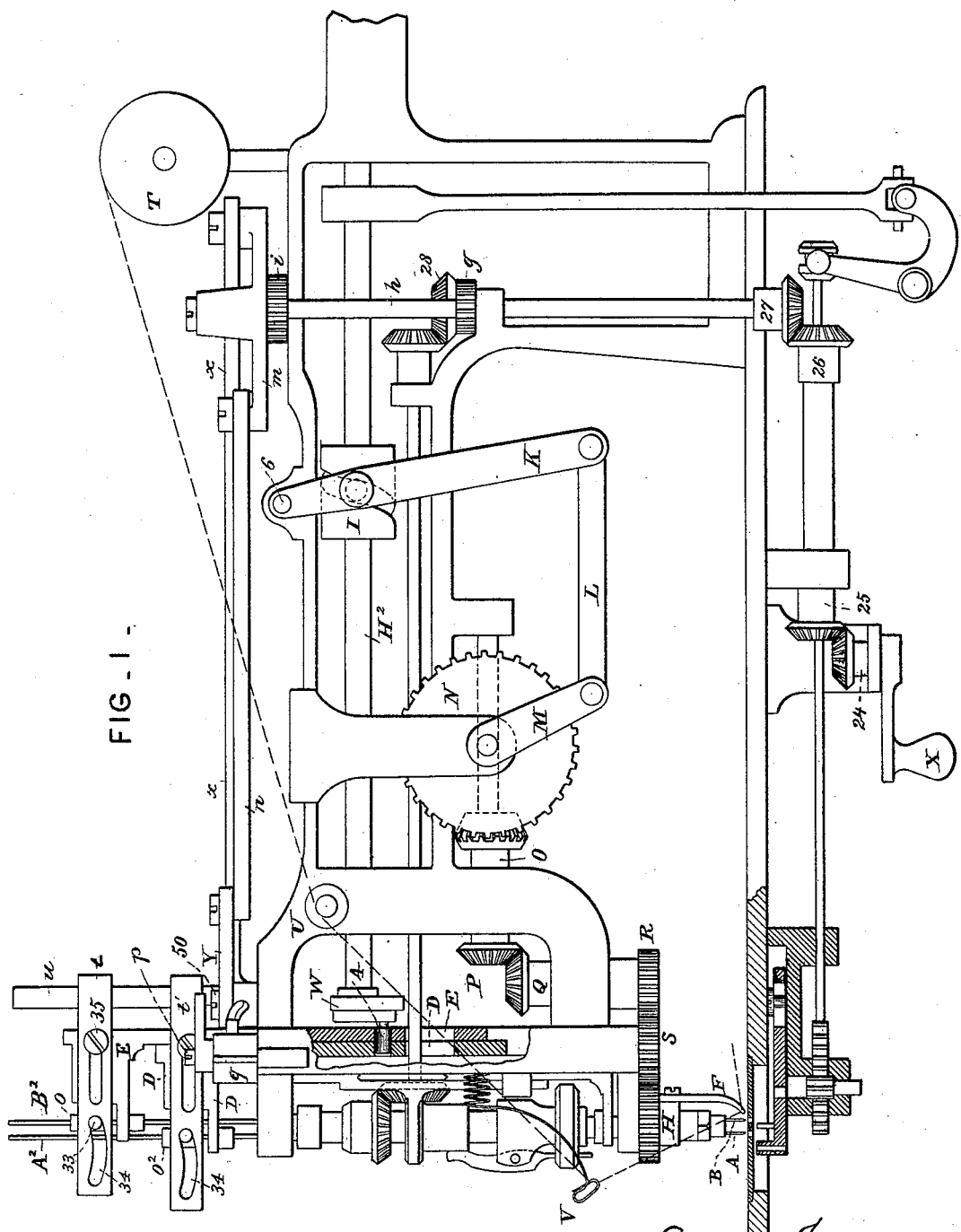
FIG. 1.
Attest:
Geo. T. Smallwood.
Philip Mauro

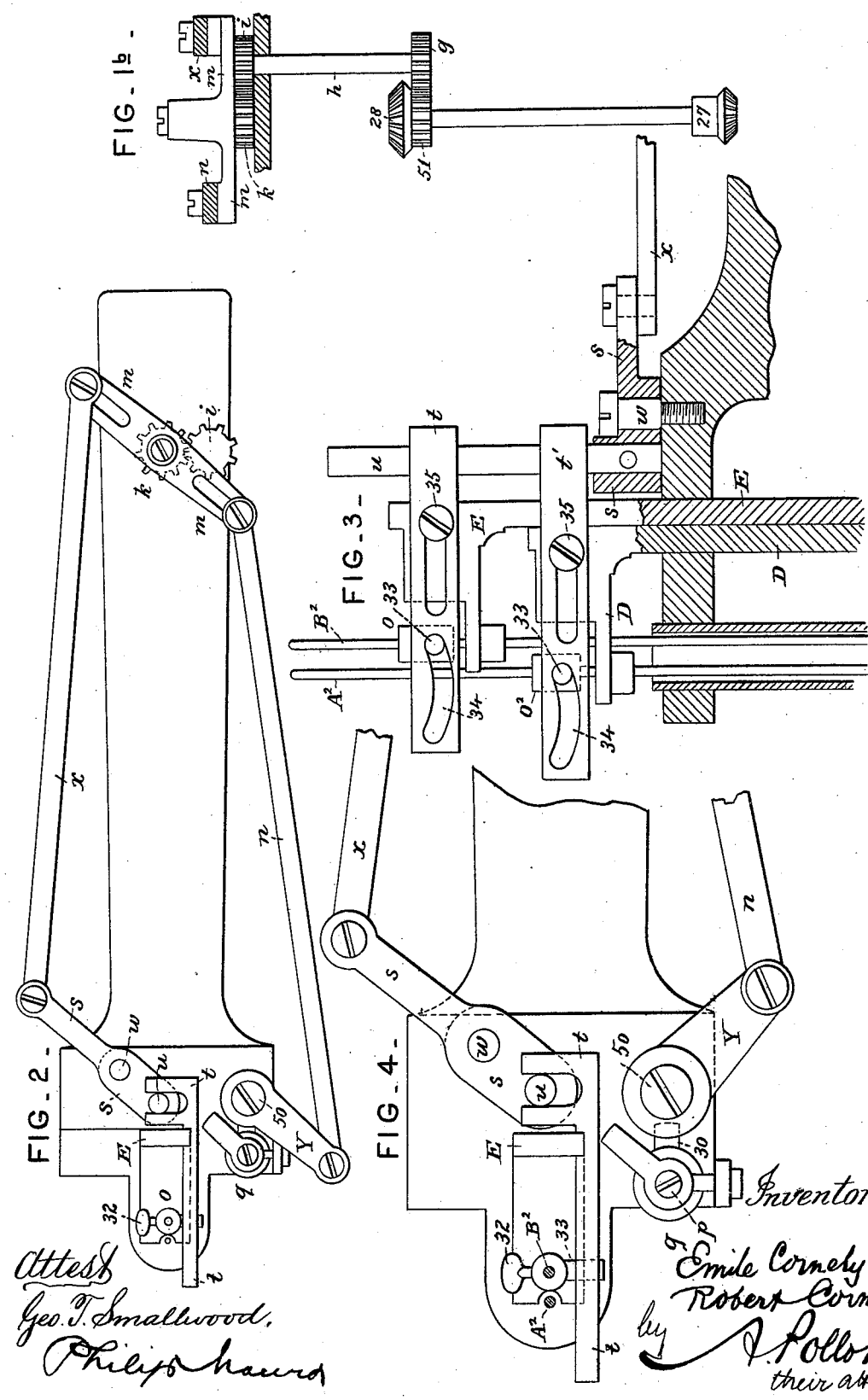

(No Model.) 5 Sheets—Sheet 3.
E. & R. CORNELY.
EMBROIDERING AND EDGING MACHINE.
No. 405,146. Patented June 11, 1889.
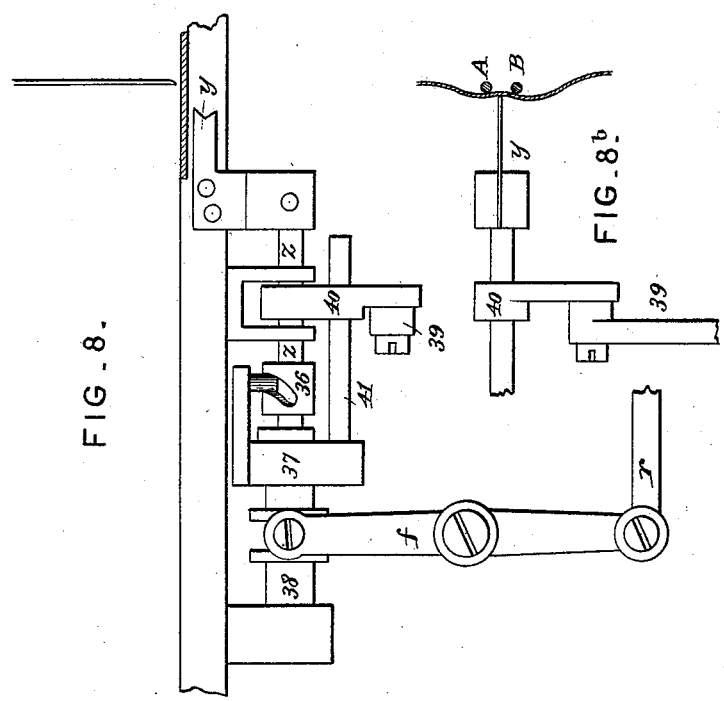
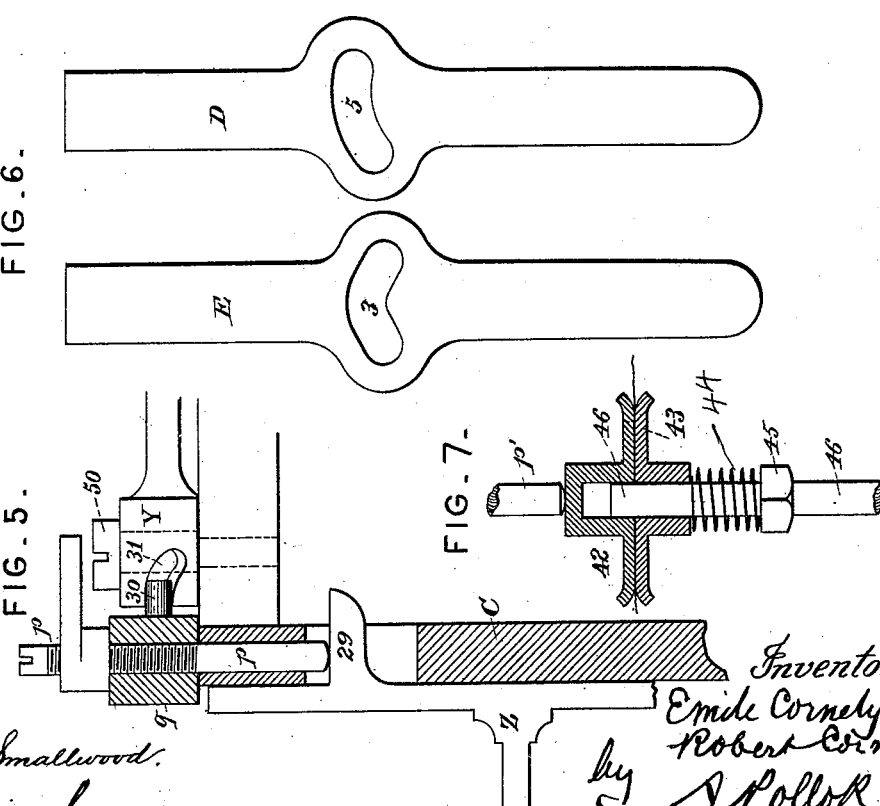
Attest:
Geo. T. Smallwood.
Philip Mauro
Inventors
Emile Cornely &
Robert Cornely
by Pollok
their attorney (No Model.) 5 Sheets—Sheet 4.
E. & R. CORNELY.
EMBROIDERING AND EDGING MACHINE.
No. 405,146. Patented June 11, 1889.
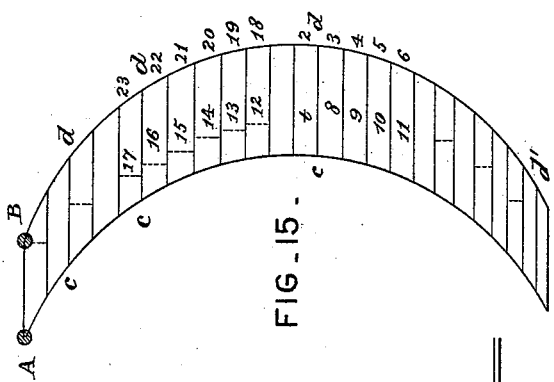
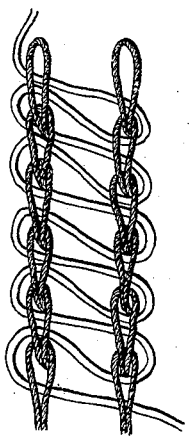
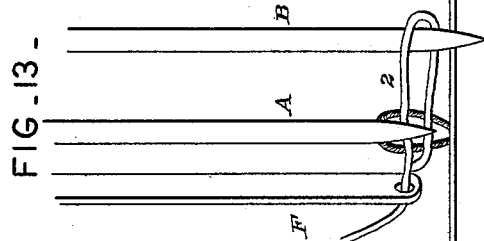
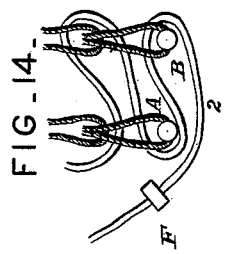
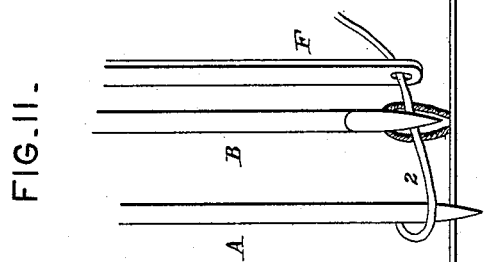
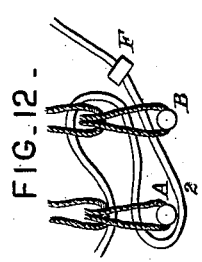
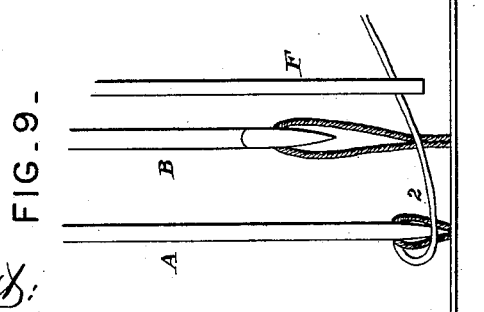
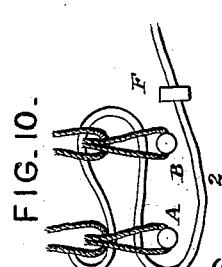
Attest:
Geo. T. Smallwood.
Philip Mauro
Inventors:
Emile Cornely
Robert Cornely
by J. Pollok
their attorney (No Model.) 5 Sheets—Sheet 5.
E. & R. CORNELY.
EMBROIDERING AND EDGING MACHINE.
No. 405,146. Patented June 11, 1889.
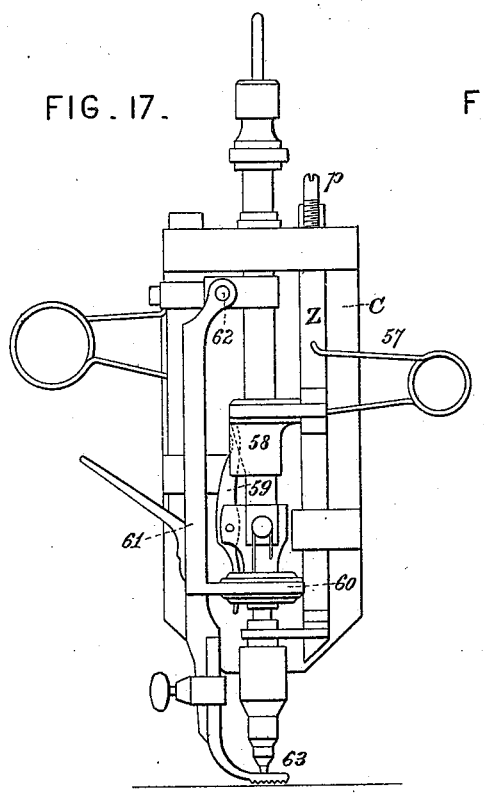
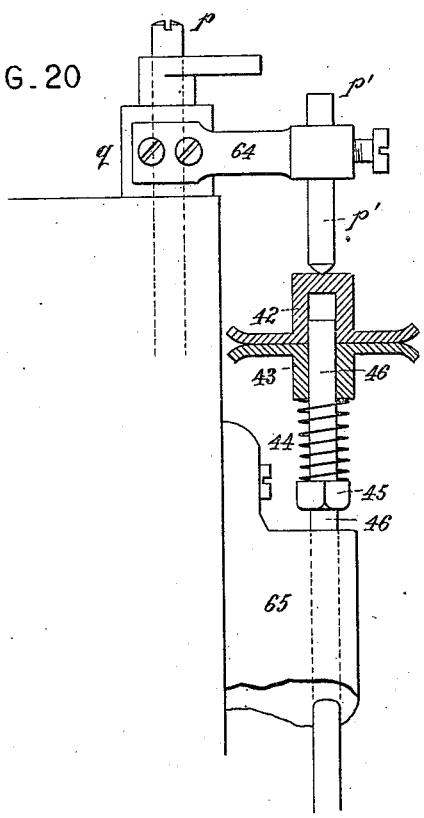
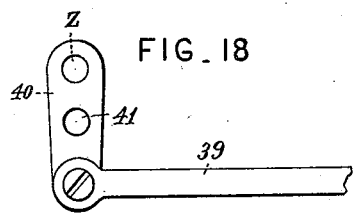
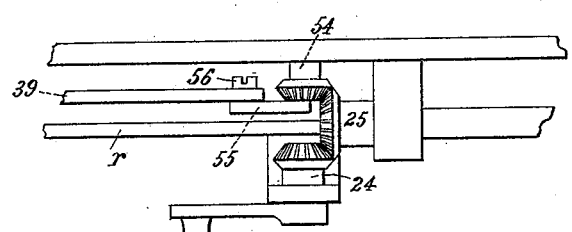
Attest:
Geo. T. Smallwood,
Philip Howe
Inventors
Emile Cornely and
Robert Cornely by
R. Pollok
their attorney

UNITED STATES PATENT OFFICE.

EMILE CORNELY AND ROBERT CORNELY, OF PARIS, FRANCE.

EMBROIDERING AND EDGING MACHINE.

SPECIFICATION forming part of Letters Patent No. 405,146, dated June 11, 1889.

Application filed December 1, 1888. Serial No. 292,394. (No model.)

*To all whom it may concern:*

Be it known that we EMILE CORNELY and ROBERT CORNELY, residents of Paris, in the Republic of France, have invented new and useful Improvements in Embroidering and Edging Machines, which are fully set forth in the following specification.

The present improvements relate to that species of machines which serve to make an edging-seam on the edges of textile fabrics, so as to secure said edges against fringing, such, for instance, as described and claimed in the English patent of Lindley and Taylor, No. 957, of April 4, 1862. The said machines, as well as all those made since, have the following principal defects: first, that the thread-carrier which carries the transversal thread must make a very rapid motion to interlace its thread properly into the seams of the two needles, thus requiring a very steep cam for its motion, which prevents the machine from running at a high speed; second, that the work of the edging-seam will not be produced regularly, owing to the fact that the transversal threads which are interlaced between the two seams will pack close together near the angles of the feston and leave spaces between them on their convex arcs.

The object of the present improvements is to remedy the said defects.

In the drawings, Figure 1 represents an elevation of said machine. Fig. 2 represents a top view thereof. The other figures represent detached views, hereinafter to be referred to.

A and B represent two needle-hooks, which are fastened to their needle-bars $A^2 B^2$. They produce two parallel rows or seams of chain-stitches, either out of one single thread or from two separate threads, by means of any of the well-known mechanisms. Each of the needle-bars $A^2 B^2$ is connected to a separate moving or cam slide D and E, which are driven from the main shaft $H^2$ by means of an eccentric pin and roller 4, which acts in their cam-grooves 3 and 5, Fig. 6. By modifying the shape of said cam-grooves, as represented at Fig. 6, the two cam-slides D and E will work independently one of the other, thus imparting to each needle the desired speed necessary to do its work. This separate independent motion of each of the two needles is the chief improvement to overcome the difficulties stated above in contradistinction to the machines used heretofore, which possess one moving slide and one needle-bar only, to which the two needles are secured, and which thus make both the same movements.

The oscillating thread-carrier F may be operated by various means. One of them is represented at Fig. 1, where the main shaft $H^2$ turns the cam I, which operates the lever K to make it swing on its stud C. Lever K operates pitman L, lever M, and the pinions N, O, P, Q, R, S, and H, to which latter the thread-carrier F is secured, and which has thus an oscillating motion around the needles A B imparted to it to the extent of about two-thirds of a turn. The operation of the two needles and of their thread-carrier F will be understood by reference to Figs. 9, 11, and 13, in elevations, and 10, 12, and 14 in top views.

In Figs. 9 and 10 the thread-carrier F makes its oscillation from the right to the left and lays its thread 2 in front of the needle A, which has made its movement down to the material, while the needle B has not yet commenced its downward motion, and when the thread-carrier F has arrived in the rear of the needles, as represented in Figs. 11 and 12, the needle B descends also, and the thread 2 will be placed behind it and in front of needle A. The two needles then descend to take up their threads for the formation of their seams, and when they rise again the thread-carrier F makes its return motion from the right to the left and lays its thread in front of the needle B and behind the needle A, as represented in Figs. 13 and 14, and thus is produced the seam represented in Fig. 16.

It is obvious that by these independent operations of the two needles the thread-carrier F can be operated by very easy movements, which permit a high speed of the machine, and will insure certain operation. The thread of the thread-carrier F is conducted from the bobbin or spool T through the tension U and the tension-spring V to the eye of the thread-carrier F.

The same principle of independent needles can also be employed when one threaded needle is employed with a needle-hook or when two threaded needles are used, as the invention can be applied to any machine provided with two needles which produce two parallel seams of any kind of stitch.

The second point of the present improvements relates to the regular execution of the edging-seam. For manufacturing purposes, we use a feed which is governed by a crank-handle X, as thus the material need not be turned by hand; but for edging purposes it is sufficient if the material is turned one-third of a turn only. In this case the needles need not turn with the crank-handle, and remain always parallel to the straight edge of the material. They thus produce the work represented in an outline at Fig. 15, in which the two arcs represent the two seams of the needles and the cross-lines $c$ $d$ are drawn through the lines of the stitches. In the machines used heretofore the length of the stitches once set remains invariable, and consequently the spaces between the cross-lines $c$ $d$ were diminishing constantly toward the angles of the feston from $d$ to $d'$, while the lengths of the stitches 2 3 4 5 6, &c., remained invariable. The consequence was that the cross-threads interlaced between the two seams were separated by spaces near the center of the arc, or they became packed close together near the angles of the feston so much as to make the work very difficult. The problem to be resolved was therefore to make the lengths of the stitches on the arcs variable, so that the spaces between the cross-threads would remain everywhere the same—such as represented at 12 13 14 15 16 17, &c.—while the lengths of the stitches would increase toward the angle of the feston, as represented at 18 19 20 21, &c. This is accomplished in the following manner:

The crank-handle X, Fig. 1, governs the pinions 24, 25, 26, 27, and 28. On the latter is a small pinion 51, Fig. 1$^b$, which is in gear with pinion $g$, which, by means of its shaft $h$, acts upon the pinions $i$ $k$ and upon the double lever $m$, which, through pitman $n$, acts upon lever Y, which turns on its stud 50, Figs. 1, 2, 4, and 5.

The feed mechanism, which is such as ordinarily employed in well-known machines of this class, (see, for example, United States Patent No. 83,910, dated November 10, 1868,) is not illustrated in Fig. 1, being omitted for the purpose of more clearly delineating the new features which constitute the present invention. In Fig. 17, however, which is a front elevation of the head of the machine, the arrangement of the feeding devices is illustrated. The feed-slide Z is, as usual, moved downward positively by the action of a cam and lever (not shown) and raised by the action of spring 57. In its downward movement the conical sleeve 58, which is carried by said slide, acts upon the feed-lever 59, and the latter in turn acts upon the horizontal part 60 of the feed-bar 61, which is thus turned on its hinge 62, carrying with it the feed-ring 63.

Referring to Fig. 5, it will be seen that the feed-slide Z is provided with a projecting finger 29, which at each upward movement strike the screw-stud $p$. Stud $p$ thus acts as a limit-stop to determine the length of movement of the feed-slide, and since the length of movement of sleeve 58, Fig. 17, determines that of the feed surface the position of stud $p$ regulates the length of the stitch, so that by raising or lowering it the stitch can be lengthened or shortened. Stud $p$ is screwed into a sleeve $q$, from which a pin 30 projects into a cam-groove 31 in the end of lever Y. Consequently when said lever is turned by the crank-handle X, through the gearing already described, the limit stud or stop $p$ is raised or lowered. The shape of groove 31 is such that by the motion of the crank X the stitches are lengthened while the feed is moving the material toward the angles of the feston, and that they are shortened while working toward the middle of the arc.

When working with needle-hooks, it is necessary that, according to the length of the stitches, they should be supplied with more or less thread, which is done by setting the needle-hooks higher or lower, so that they will draw longer or shorter loops above the material. It is therefore necessary that the needles should be simultaneously raised when the stitch is lengthened, and that they should be lowered when the stitch is shortened, which can be done by the following described mechanism.

The needle-bars $A^2$ $B^2$ are secured to sleeves $o$ and $o^2$ by means of set-screws 32, Figs. 1, 2, 3, and 4, and a pin 33 of the sleeve $o$ extends into the cam-groove 34 of the slide $t$, which can move horizontally in suitable guides of the cam-slide E, and which is held thereon by the screw 35. The fork-shaped end of the slide $t$ embraces a rod $u$, which is secured in the hub of the lever $s$, which turns on its stud $w$. The lever $s$ is connected to the lever $m$ by means of the pitman $x$, and when it is turned the rod $u$ acts upon the slide $t$ and moves it horizontally, and its cam-groove 34 causes pin 33, sleeve $o$, and the needle-bar $B^2$ to rise or to descend simultaneously with the lengthening or shortening of the stitch through the action of the crank-handle $x$. The needle-bar $A^2$ is operated upon by a similar device $t'$, which is connected with the cam-slide D, and which is also operated by shaft $u$.

The invention may be applied to machines such as described in Letters Patent No. 262,743, by which two chain-stitch seams are produced by needle-hooks from a single thread, a sliding blade being employed to push the thread in between the two needles when they reach their lowest position. It is necessary that the sliding blade should be controlled by the crank-handle X, so as to supply to the needle-hooks a greater length of thread when working on long stitches than when working on shorter stitches. This can be effected by the means illustrated in Figs.

8, 8ᵇ, 18, and 19, Fig. 8 being an elevation, Fig. 8ᵇ a plan and Figs. 18 and 19 details in side elevation.

As shown, the blade y is reciprocated by means of a rod Z, the latter being coupled to a sleeve 38 by means of a pin on part 37, which pin enters the cam-groove of sleeve 36. Sleeve 38 receives its reciprocating motion from the main shaft through a connection-rod r and lever f, and imparts such motion to rod Z through the connection 37 and its pin, causing blade y to move to and away from the needles A B. It is obvious that the end of the forward stroke of blade y depends upon the position of said pin in said groove. This position is variable, and is controlled by the crank-handle X through the mechanism which will now be described.

A lever 40 is centered on rod Z, and a pin 41, projecting from part 37 of sleeve 38, passes loosely through a hole in said lever, Fig. 18. Consequently by turning said lever the part 37 is also turned, and the position of its pin in the cam-groove is changed. The stroke of rod Z is thereby varied, and blade y is caused to advance farther, or less far, at each forward movement, supplying the needles with more or less thread. The regulating-lever 40 is connected with and actuated by the crank-handle X through connection-rod 39, jointed by screw 56 to arm 55 of pinion 54, which receives motion from the crank-handle through pinions 24 and 25. Thus, when the operator turns the crank-handle to change the direction of the feed, thereby varying the length of stitch, as above pointed out, he also varied correspondingly the supply of thread to the needles.

When one or two threaded needles are employed instead of hook-needles, then the tension of their thread must also automatically vary in conformity with the length of the stitches, which can be effected by means of the automatic tension device represented at Fig. 7, in which the stud p', similar to that represented at Fig. 5, bears against the movable tension-disk 42, which is in contact with a similar tension-disk 43. Both tensions can play upon the rod 46, and the disk 43 is supported by the spring 44 and by the screw-nut 45. The thread passes between the two tension-disks, and on raising or lowering the stud p', as shown in Fig. 5, by the action of the crank-handle X the tension of the thread is loosened or tightened in conformity with the lengths of the stitches.

Fig. 20 shows in elevation (partly in section) how the regulating-studs of the feed and tension, respectively, may be connected together when both are used. The tension-rod 46 passes through a hole in casting 65, attached to frame c, and the stud p', for controlling the tension, is connected to sleeve q (which carries the feed-stud p) by a cross-bar 64, so that both studs move together with said sleeve.

It is evident that the arrangements for driving the thread-carrier F, for producing the variable lengths of stitches, for raising and lowering the needles, and for supplying them with more or less thread can be much changed, and that the same effects can be obtained in various manners. We therefore do not limit our invention to the devices above described.

What we claim as our invention, and desire to secure by Letters Patent, is—

1. In an embroidering or edging machine, the combination of two parallel needles supported and actuated independently of each other, a thread-carrier for interlacing a thread between the two needles, and operating mechanism for said parts, substantially as described.

2. The combination of the parallel needles and co-operating stitch-forming mechanism for making separate parallel seams, needle-bars, one for each needle, needle-slides, one for each needle, mechanism for reciprocating said slides, and a thread-carrier, substantially as described.

3. The combination of needles and co-operating stich-forming mechanism for making separate parallel seams, needle-bars, one for each needle, an oscillatory thread-carrier for laying a thread between said needles, a separate slide for each needle-bar, each slide having a cam, and a moving part acting on said cams for reciprocating said slides, said cams being arranged relatively to each other, as specified, whereby one needle completes its stroke in advance of the other, substantially as described.

4. The combination, with the feed-bar, feed-slide for actuating the same, and the governing-handle of a universal feed, of an adjustable stop arranged in the path of a projection of said slide so as to limit its stroke, said stop and handle being connected together, so that the motion of the latter to change the direction of the feed raises or lowers said stop, substantially as described.

5. The combination, with the feed-slide and governing-handle of a universal feed, of a stop for limiting the stroke of said slide, a cam for changing the position of said stop to vary the stroke of said slide, and connections, as specified, between said cam and handle, the acting face of said cam being disposed, as herein set forth, to move said stop in the direction to lengthen the stroke of the feed-slide when the direction of the feed is changed to work from the center of an arc toward the angle, substantially as described.

6. The combination, with a reciprocatory needle-bar and the universal feed mechanism, including a governing crank-handle, of a cam and connections for varying the length of stroke of said needle-bar, said cam being connected with and operated by said crank-handle, substantially as described.

7. The combination of a needle-bar, universal feed mechanism, including a feed-slide and governing crank-handle, and mechanism, as specified, controlled by said handle for varying the length of feed, said needle-bar being connected with said handle, whereby the stroke of the former is varied in accordance with the variations in the length of stitch, so as to draw more or less thread for the needle, substantially as described.

8. The combination, with variable universal feed mechanism, including a governing-handle for varying the length of feed in changing its direction, of a tension comprising tension-disks, between which the thread passes, and an adjustable stud or pin for regulating the pressure of said disks, said stud or pin being connected with and adjusted by said handle in accordance with the variations of the feed, substantially as described.

9. The combination, with hook-needles and the variable universal feed mechanism, including a governing-handle, of a sliding blade for pushing thread between said needles, said blade being connected by devices, such as herein specified, through which the motions of said handle are transmitted to said blade, substantially as described.

In testimony whereof we have signed this specification in the presence of two subscribing witnesses.

EMILE CORNELY.
    ROBERT CORNELY.

Witnesses:
 J. L. RATHBONE,
 R. J. PRESTON.